United States Patent [19]

Travaglio

[11] 4,274,654
[45] Jun. 23, 1981

[54] STRUT FOR MACPHERSON-TYPE SUSPENSIONS FOR MOTOR-VEHICLES

[76] Inventor: Giuseppe Travaglio, Via U. Foscolo 4, Asti, Italy

[21] Appl. No.: 120,852

[22] Filed: Feb. 11, 1980

[51] Int. Cl.³ .............................................. B60G 11/58
[52] U.S. Cl. ................................... 280/668; 280/791; 280/493
[58] Field of Search ............... 280/660, 666, 667, 668, 280/710, 691, 693

[56] References Cited

U.S. PATENT DOCUMENTS

| 3,917,308 | 11/1975 | Schulz | 280/691 |
| 4,042,259 | 8/1977 | Fiedler | 280/668 |
| 4,084,837 | 4/1978 | Milner | 280/668 |
| 4,194,760 | 3/1980 | Shiomi | 280/668 |
| 4,223,903 | 9/1980 | Grabb | 280/668 |

FOREIGN PATENT DOCUMENTS 2514456 10/1976 Fed. Rep. of Germany .
2299982 9/1976 France .
988503 4/1965 United Kingdom .

Primary Examiner—Robert R. Song

[57] ABSTRACT

A strut for MacPherson-type suspensions for motor-vehicles comprises an upper tubular member of sheet metal which forms the cylinder of a telescopic shock absorber, and a sheet metal housing having an upper wall with a circular aperture. An additional reinforcing member of sheet metal is welded to the housing to define a supplementary wall adjacent to the upper wall of the housing. The supplementary wall has a circular aperture, aligned with, and spaced from, the circular aperture of the upper wall. A lower portion of the tubular member is engaged with a close fit into the said two aligned apertures and is fixed by welding to an edge of at least one of the apertures.

23 Claims, 20 Drawing Figures

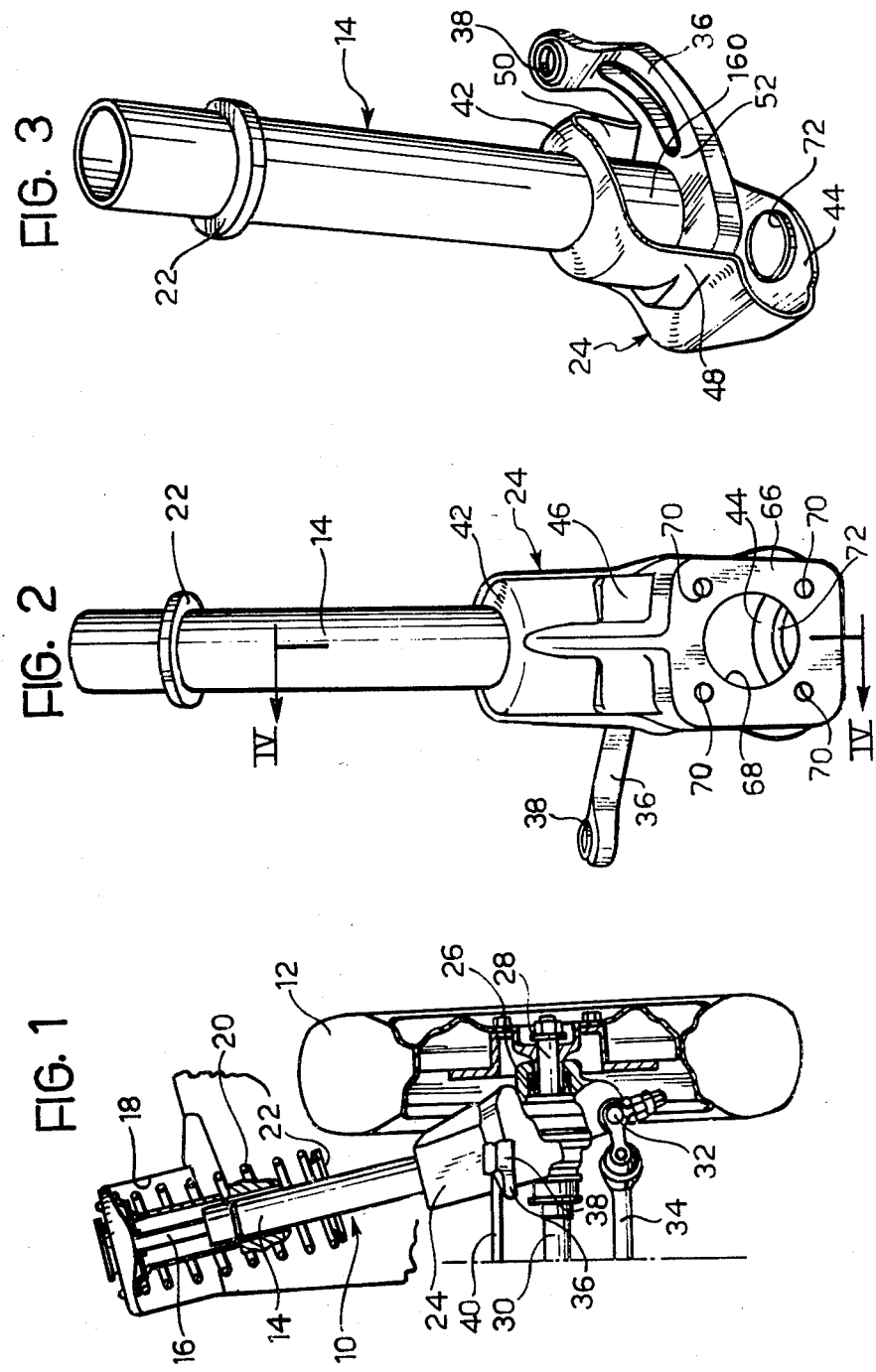

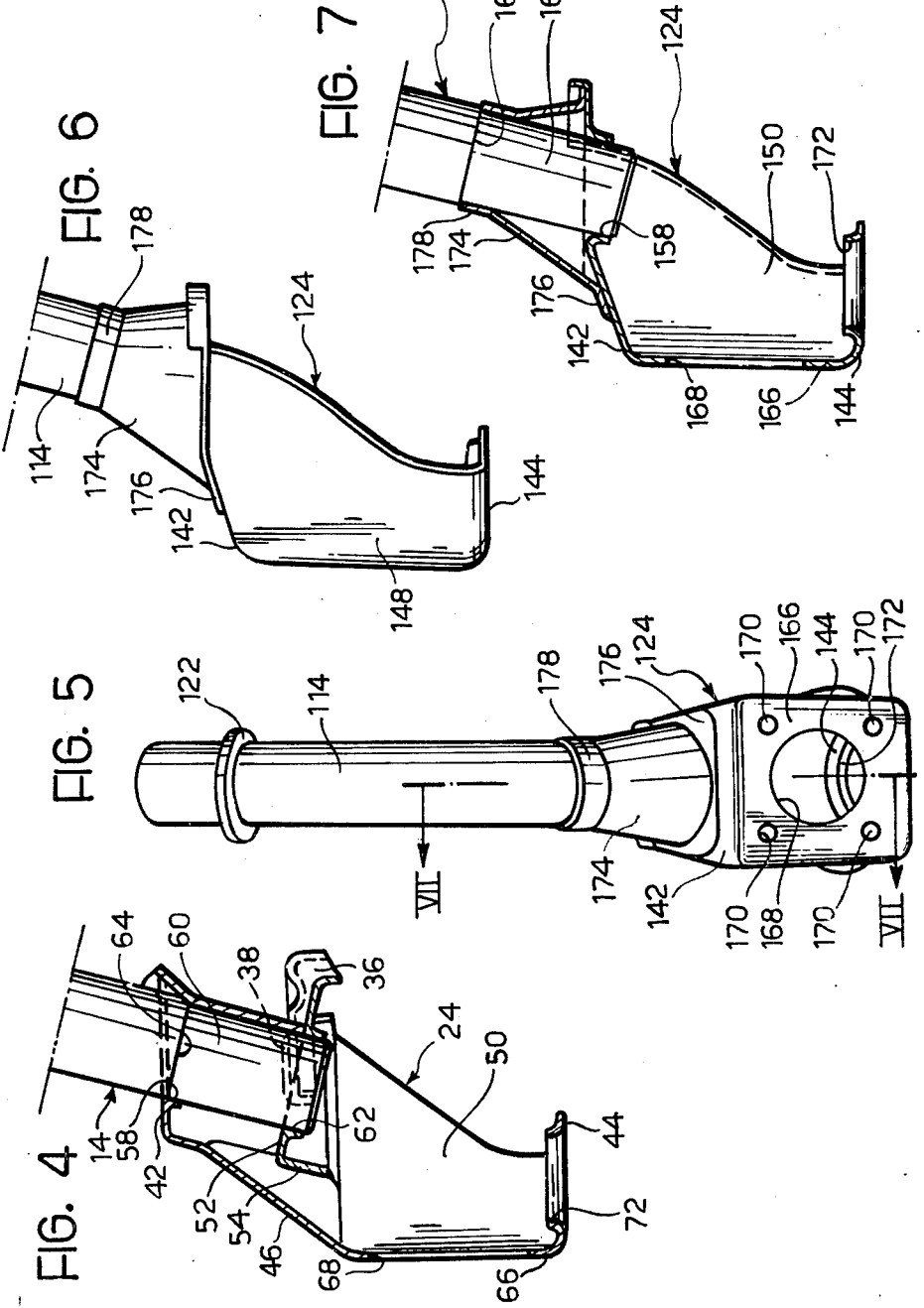

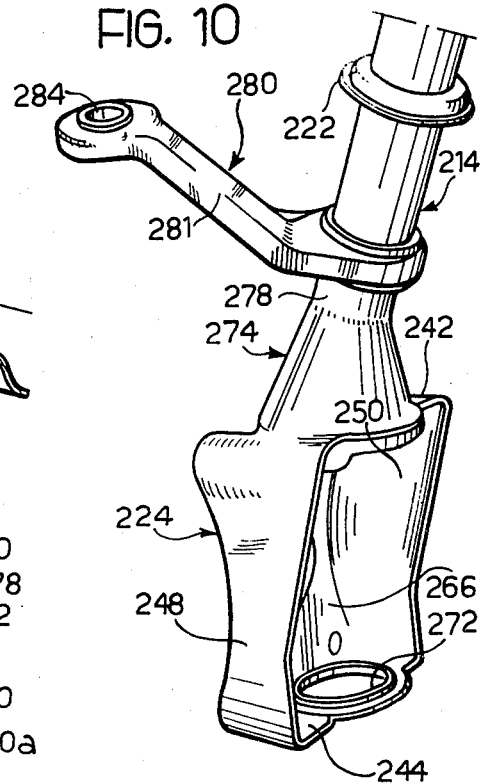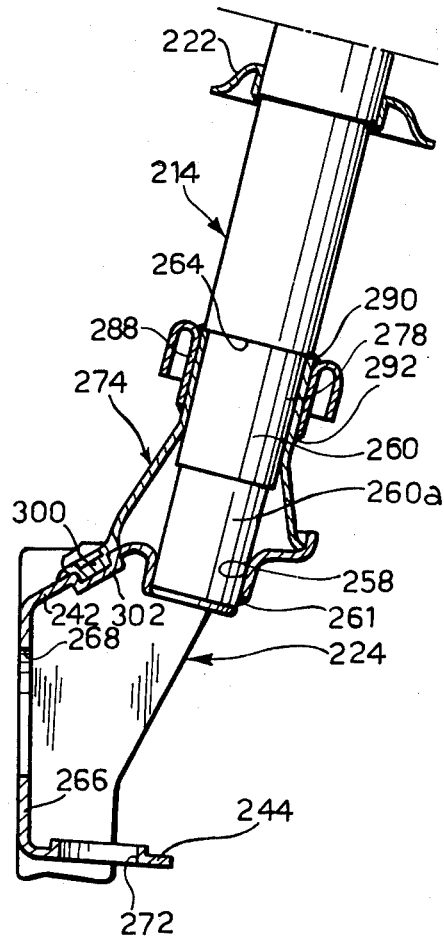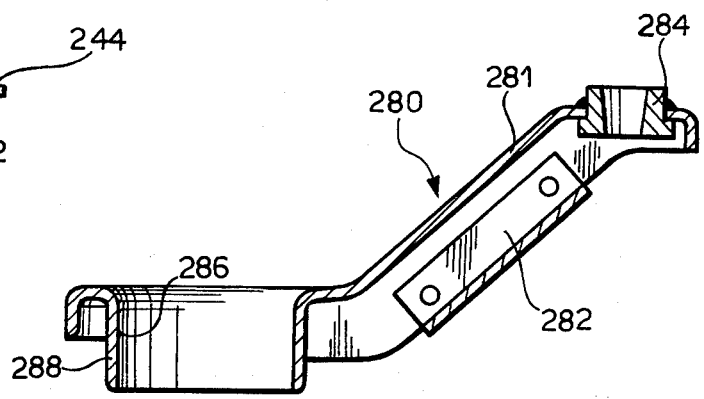

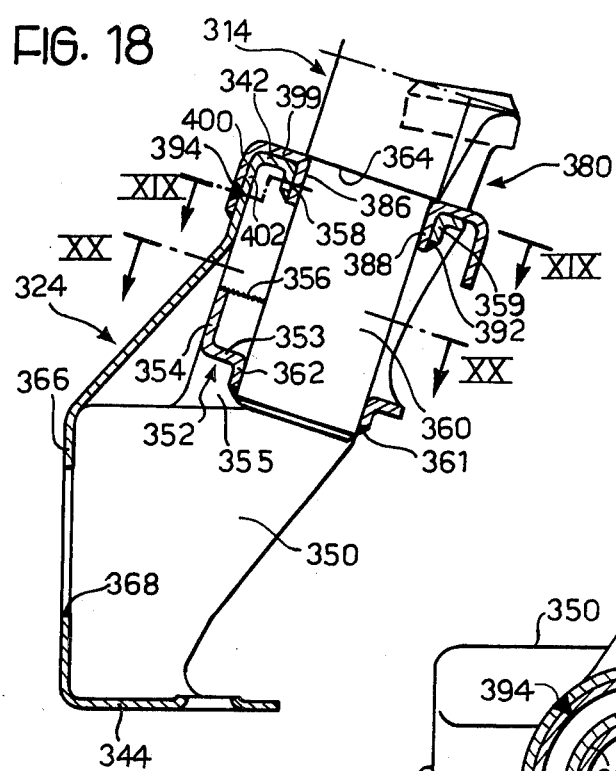
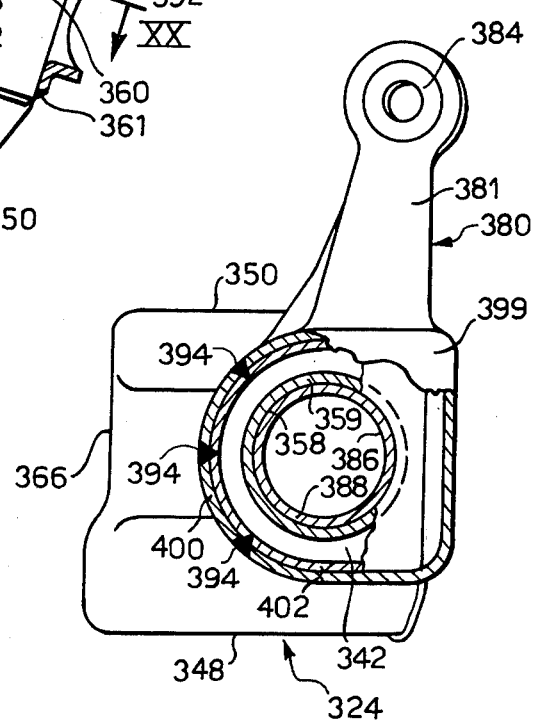
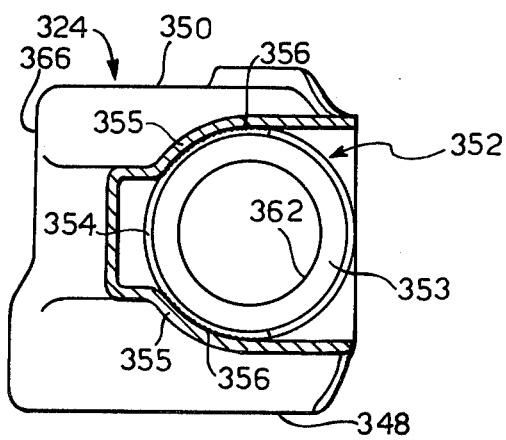

STRUT FOR MACPHERSON-TYPE SUSPENSIONS FOR MOTOR-VEHICLES

BACKGROUND OF THE INVENTION

The present invention relates to a strut for MacPherson-type suspensions for motor-vehicles, of the type comprising an upper tubular member of sheet metal which forms the cylinder of telescopic shock absorber, and a sheet metal housing having an upper wall with a circular aperture, a lower wall with a hole for the attachment of one of the parts of a ball-and-socket joint of a suspension wishbone, a lateral end wall defining a flange for the attachment of a bearing bush or bearing spindle and a static part of a wheel brake, and a pair of opposing faces, a lower part of the tubular member being engaged in the circular aperture of the upper wall of the housing and fixed to the said housing by means of welding.

A structure of this type is known from the published French patent application No. 2,299,982.

In known struts for MacPherson suspensions the connecting member is usually formed by forged steel or cast iron. Parts of this type have the disadvantages of being expensive, not only because of the forging or casting operations necessary, but also, and above all, because of the subsequent finishing operations necessary on the forged or cast part. A further disadvantage is that a connecting member of steel or iron constitutes an unsuspended mass of considerable weight and is, therefore, undesirable.

The solution described in the French application No. 2,299,982, using a sheet metal housing, reduces both the costs of manufacture and the weight of the connecting member. Indeed, a housing of sheet metal may be made more economically and with a lighter weight than an equivalent member of forged steel or cast iron.

However, in the French application No. 2,299,982 the lower end of the tubular member is simply fixed in, and welded to the edge of, a circular aperture in the upper wall of the housing. This solution has the disadvantage of not ensuring a sufficient bending strength of the strut in relation to the housing. In fact, the bending forces which occur, in use, between the strut and the housing can produce undesirable elastic deformation of the upper wall of the housing, with consequent angular oscillations of the axis of the tubular member with respect to the predetermined, projected position of the axis. If the bending forces are very high, the upper wall of the housing may be permanently deformed, with a consequent permanent angular displacement of the axis of the tubular member with respect to its predetermined position. Furthermore, the welding which joins the lower end of the tubular member to the upper wall of the housing is subject to fatigue in use and may eventually break, with the possibility of serious accidents resulting from the actual collapse of the suspension of the vehicle.

These disadvantages are reduced by using sheet metal of considerable thickness (of the order of 10 millimeters) as seems to be apparent from the drawings of the French application in question. The use of very thick sheet metal reduces the advantages of cost and weight which could be achieved with the use of strong but thinner sheet metal, that is, with a thickness of the order of 3 to 4 millimeters.

British Pat. No. 988,503 illustrates and describes a strut for MacPherson suspensions in which the connecting member is formed by a strong piece of steel or cast iron which has the aforesaid disadvantages relating to cost and weight. The connecting member has a pair of upper and lower arms comparable to the upper and lower walls of a sheet metal housing. A circular aperture is bored in the upper arm and a circular seating is made in the lower arm. The lower part of the tubular member is engaged in both the aperture of the upper arm and the seating of the lower arm and is moreover brazed to the upper arm. This solution, as a result of the double engagement, effectively ensures a high bending strength of the tubular member with respect to the connecting member.

This solution is applicable to the connection of a tubular member with a connecting member of sheet metal and is mentioned in the published German patent application (Offenlegungsschrift) No. 25.14.456. In this application the tubular member is welded to the interior of a corresponding, sleeve-shaped part of a sheet metal connecting member. The same application provides for the possibility of making the sleeve part lighter by removing an intermediate portion from it. As a result of this removal the sleeve part is reduced to a pair of upper and lower bush portions which may be considered equivalent to the upper and lower walls of a sheet metal housing or to the upper and lower arms of the British Pat. No. 988,503. However, the German application in question does not provide for the axial support of the tubular member with respect to the sheet metal connecting member.

The provisions of both the British Pat. No. 988,503 and the German patent application No. 25.14.456 have the disadvantage that the tubular member extends through the full height of the connecting member. In the case of a suspension for drive wheels, this precludes the passage of a horizontal drive shaft through the connecting member, since the section of the tubular member which extends substantially vertically through the connecting member would interfere with the drive shaft.

A further disadvantage of these arrangements is that the presence of the lower end portion of the tubular member in contact with the lower aperture of the housing makes it impossible to assemble, inside the latter, a part (ball or spherical seating) of a ball-and-socket joint for the connection of the suspension wishbone. As is well known in many MacPherson-type suspensions, it is desirable to arrange this ball-and-socket joint as high up as possible, that is, as near as possible to the substantially horizontal axis of rotation of the wheel (insofar as this is allowed by the presence of a possible drive shaft, in the case of a drive wheel). By assembling the ball-and-socket joint very high up, a reduction is in fact, obtained in the moment arm of the stress forces in the connecting member, the length of this arm being equal to the distance between the axis of rotation of the wheel and the center of the ball-and-socket joint. In this way the housing and tubular member assembly is under less stress.

The present invention has the object of eliminating the said disadvantages by providing a strut for MacPherson-type suspensions with a low manufacturing cost and a low weight, due to making its connecting member or housing from strong, but not excessively thick, sheet metal, and in which, on the one hand, the connection between the tubular member and the connecting member is extremely resistant to bending forces and, on the other hand, the internal space of the housing is substantially free, for example, for the passage of a drive shaft or from the positioning of one of the members of a ball-and-socket joint.

SUMMARY OF THE INVENTION

According to the present invention there is provided a strut of the aforesaid type, characterized in that an additional reinforcing member of sheet metal is welded to the housing to define a supplementary wall adjacent to the upper wall of the housing, the supplementary wall having a circular aperture, aligned with, and spaced from, the circular aperture of the upper wall, and in that the lower portion of the tubular member is engaged with a close fit into the said two aligned apertures and is fixed by welding to an edge of at least one of the apertures.

According to this solution, a strut is provided, a lower part of which is firmly engaged in a pair of aligned apertures, with the aforesaid advantages of better distribution, compared with the prior art, of the forces between the tubular member and the housing, forces which, in the prior art, are very concentrated. Despite this double engagement the proximity of the upper wall of the housing to the supplementary wall defined by the additional reinforcing member affords, within the housing, sufficient space for the unobstructed passage of a drive shaft and/or for the positioning of a ball-and socket joint in the lower part of the space, or even towards the mid-height part of the space. The presence of the additional sheet metal member contributes, moreover, to the strengthening of the housing, which makes possible the adoption of a housing of relatively thin, drawn sheet metal.

Furthermore, the fact that the tubular member does not extend as far as the lower wall of the housing contributes to a reduction in the weight of the strut, since it is possible to use a tubular member which is shorter than those used in the prior art cited above. This arrangement is also advantageous when the strut is intended for the suspension of a rear supporting wheel, that is, a non-driven wheel.

Preferably, the tubular member has a shoulder which abuts externally against an edge of the outer circular aperture, that is, the aperture which is the more external, with respect to the housing, and the tubular member is welded at its lower end to an edge of the inner circular aperture, that is, the aperture which is the more internal, with respect to the housing.

This solution is advantageous because the welding of the tubular member to the housing is effected in a zone of the tubular member which, being situated at its end, is barely stressed, as a result of which any damage to the sheet metal of the tubular member due to the effects of the welding heat does not have any harmful influence on the overall strength of the member. Furthermore, the abutment of the shoulder against the edge of the outer circular aperture prevents, in use, the sinking of the tubular member into the housing under the weight of the part of the motor vehicle supported by the said member.

In a first preferred embodiment the additional reinforcing member comprises an intermediate wall of drawn sheet metal which is situated within the housing substantially parallel to the upper wall and which has the said inner circular aperture, the additional member being fixed by welding to the lateral end wall and/or to the faces of the housing.

In this first preferred embodiment the housing is reinforced from inside.

Preferably, in the first embodiment the intermediate wall has, substantially in its plane, a shaped arm which projects from an open face of the housing and is curved or bent such that it has a free end lateral with respect to the housing, this arm forming a steering lever or an anchoring arm for the strut.

The advantage of this solution lies in the fact that use is made of a single additional member to perform the dual function of reinforcing the housing and a steering lever or anchorage arm.

In a second preferred embodiment, the additional reinforcing member comprises a substantially frusto-conical sleeve of drawn sheet metal which is attached to the upper wall of the housing, the larger base of the sleeve having a peripheral flange welded to the upper wall around the circular aperture in the latter and the smaller base being delimited by a cylindrical bush portion which defines the other circular aperture aligned with the circular aperture of the upper wall.

This second embodiment has the advantage that no reinforcing member is inserted within the housing, as a result of which the internal space of the latter remains completely free and accessible for the passage of other components attached to the exterior or the interior of the housing.

Preferably, in a variant of the second embodiment, the strut comprises a steering lever or anchorage lever formed by a member of strong, drawn, sheet metal having a connecting eye, the periphery of which is defined by a cylindrical flange which fits precisely the bush portion of the reinforcing sleeve, and which is welded to the bush portion.

In another variant of the first embodiment, the upper wall of the housing is a double wall which comprises the upper wall and a supplementary wall situated above it, these walls having respective aligned circular apertures into which the tubular member is engaged, the shoulder of the tubular member abuts against an edge of the supplementary aperture and the additional wall forms part of a steering lever or anchorage lever including a member of strong, drawn, sheet metal, the lever being fixed by welding to the housing.

Both these solutions can be applied to the steering wheel of a steering system in which the steering box is situated at a high level. This arrangement is very useful in certain motor vehicles in which the steering system comprises a steering box situated at a very high level, when it is practical to connect a respective link rod to a steering lever situated at a lever higher than that of the connecting member or housing. These solutions can be applied to the anchorage of the strut in a high position, in the case of a non-steering wheel.

In certain known struts, the steering lever comprises a member of drawn sheet metal which is welded directly to the tubular member or the cylinder of the suspension shock absorber. In this way, the torsional stresses of the steering pass through the portion of the tubular member between the steering lever and the connecting member. A metal tubular member with a "sound" structure can resist the torsional stresses without any difficulty. However, the welding which connects the lever to the tubular member weakens the latter, insofar as it damages its structure and renders it susceptible to failure, not only as a result of the torsional stresses of the steering, but also as a result of the axial stresses due both to the weight of the vehicle and to the acceleration forces caused by the "springing" of the suspension.

In the variants provided for a "high" lever, the torsional stresses are transferred by the lever to the connecting member through the reinforcing sleeve and not through the tubular member. The latter retains its structural integrity because it is not welded to the bush portion of the reinforcing sleeve.

These solutions are not only applicable to those steering systems in which the steering box is situated in a high position; with a lever of appropriate shape it is possible to arrange the end for connection to the rod at a level lower than the connecting eye and corresponding bush portion of the reinforcing sleeve, for example, at a level half as high as the connecting member or even at a level lower than the connecting member.

BRIEF DESCRIPTION OF THE DRAWINGS

Further characteristics of the invention will be apparent from the following, more particular description made, by way of example, with reference to the accompanying drawings in which:

FIG. 1 is a partially-sectioned, elevational view of a MacPherson-type suspension associated with a steering wheel of a motor vehicle and incorporating a strut according to a first embodiment of the present invention;

FIG. 2 is an elevational view, on an enlarged scale, of the strut of FIG. 1, seen from the side which, in use, faces the wheel;

FIG. 3 is a three-quarters perspective view, on the same scale as FIG. 2, of the strut seen from the opposite side of FIG. 2;

FIG. 4 is a partial vertical section taken along the line IV—IV of FIG. 2;

FIG. 5 is an elevational view, similar to FIG. 2, showing a second embodiment of a strut adapted for use in a suspension without a steering lever or anchorage lever and which may be used for a non-steering wheel;

FIG. 6 is a lateral view of a lower part of the strut of FIG. 5;

FIG. 7 is a vertical section taken along the line VII—VII of FIG. 5;

FIG. 10 is a three-quarters perspective view of the strut seen from the opposite side to FIG. 8;

FIG. 11 is a sectional view taken along the line XI—XI of FIG. 8;

FIG. 13 is a longitudinal section of a steering lever of the strut, taken along the broken line XIII—XIII of FIG. 12;

FIG. 18 is a fragmented vertical section, similar to FIG. 4, of a variant of the first embodiment of FIGS. 1 to 4, and FIGS. 19 and 20 are cross sections taken along the broken lines XIX—XIX and XX—XX, respectively, of FIG. 18, in which the tubular member of the strut is not shown.

DETAILED DESCRIPTION

Figure 8:
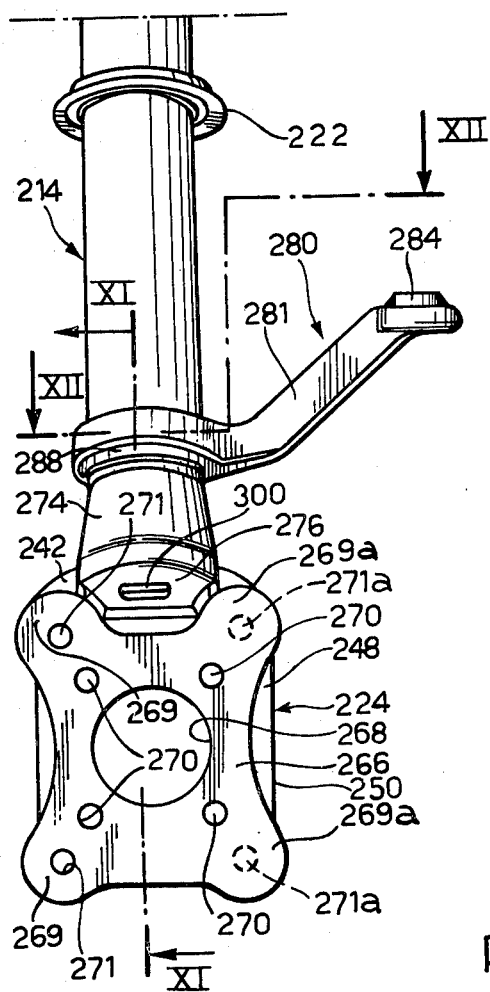
FIG. 8 is an elevational view of a strut according to a variant of the second embodiment shown in FIGS. 5 to 7, seen from the side intended to face the wheel.
Figure 9:
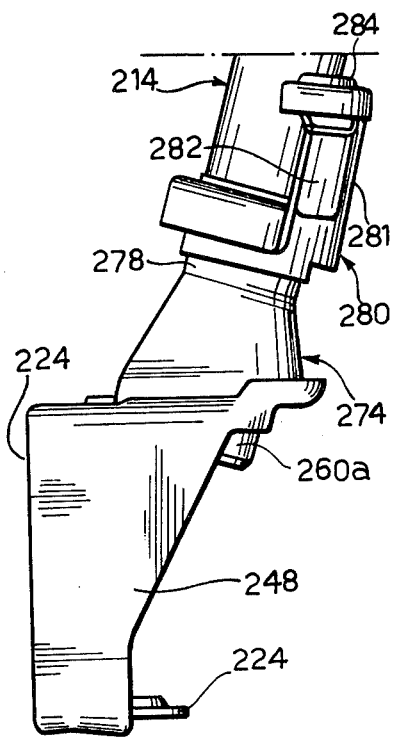
FIG. 9 is a lateral view of the strut of FIG. 8.

In FIG. 1 there is shown a strut, generally indicated 10, of a MacPherson-type suspension for a front steering and drive wheel 12 of a motor car. The strut 10 comprises an upper tubular member 14 of sheet metal which forms the cylinder of a hydraulic telescopic shock absorber, the piston shaft 16 of which is pivoted to the upper wall of a recess 18 made in the bodywork of the vehicle. Associated with the shock absorber is the usual helical coil spring 20 which abuts at its lower end against a small sheet metal wsher 22 welded to the tubular member 14.

To the lower portion of the tubular member 14 there is fixed, in a manner which will be clarified below, a connecting member which, as described below, comprises a housing 24 of strong, drawn sheet metal.

To the connecting member 24 is fixed, in a manner which will be clarified below, a bush 26 which supports the bearings and the static part (caliper-holder or shoe-holders) of a brake associated with the wheel 12. A conventional wheel axle 28 is rotatable in the bush 26, the axle extending through the connecting member 24 and being connected to a drive shaft 30.

The connecting member 24 also supports at its lower end a ball-and-socket joint 32 to which is articulated the end of a suspension wishbone 34.

The connecting member 24 is also provided with a steering lever 36, made in a manner which will be described below, which has a free end with an eye 38 into which is fixed an articulation member for a steering link rod 40.

Reference will now be made to FIGS. 2, 3 and 4 to describe the strut 10 in detail. In these Figures, the parts already described with reference to FIG. 1 are indicated by the same reference numbers.

As has already been stated, the housing 24 comprises a single piece of strong, drawn sheet metal, for example, sheet steel with a thickness of the order of 3 to 4 millimeters.

The housing 24 comprises an upper wall 42, a lower wall 44, a lateral end wall 46 and a pair or opposing, shaped faces 48 and 50 which interconnect the said walls 42, 44, 46.

In the housing 24 is located an additional reinforcing member comprising an intermediate wall 52 of strong, drawn sheet metal. The intermediate wall 52 is substantially parallel to the upper wall 42 and has a peripheral edge or flange 54 by means of which it is welded to the end wall 46 and/or to the two faces 48, 50.

In a single piece with the intermediate wall 52 there is formed, by means of drawing, the steering lever 36 with its respective terminal eye 38 for connection to the steering link rod. As can be seen, the lever 36 is formed by a shaped arm of the wall 52 which protrudes from the open face of the housing and is curved or bent such that its free end with the eye 38 is situated so as to form a lateral arm for connection, by the eye 38, to the steering link rod 40, (FIG. 1). In the case of a non-steering wheel, the lever 36 could usefully be provided for connection to an anchoring bar. Furthermore, if it is desired, the lever 36 may have a box structure to give it greater strength.

The arrangement illustrated shows a strut for a left-hand steering wheel, for a right-hand steering wheel the lever 36 would be arranged in a mirror-image to that shown.

In the upper wall 42 of the housing 24 there is made a flanged circular aperture 58 in which is force-fitted a lower end portion 60 of the tubular member 14. The intermediate wall 52 also has a flanged circular aperture 62, aligned with the preceding aperture and in which is engaged the lowermost end of the lower portion 60 of the tubular member 14. This lower end is fixed to the flange or raised edge of the aperture 62 by welding, preferably a continuous bead-weld. The lower portion 60 of the tubular member 14 has a diameter slightly less than that of the rest of the said member so as to define an annular bearing shoulder 64 on the edge of the aperture 58.

As will be understood, the intermediate wall 52, as well as permitting the incorporation of the lever or arm 36, also provides medial reinforcement of the housing 24. Moreover, because of its engagement in the two apertures 58, 62, the lower portion 60 of the tubular member 14 is firmly fixed in the housing 24. Welding of the tubular member 14 to the housing in correspondence with the edge of the aperture 58 is not necessary. Nevertheless, in this position the presence of the annular shoulder 64 prevents the tubular member 14 from "sinking" into the housing 24, while the welding at the edge of the aperture 62 prevents the tubular member 14 from slipping out of the housing 24.

The lateral end wall 46 has a lower flat part 66 with a large circular aperture 68 surrounded by a ring of holes 70. The flat part 66 forms a flange for the attachment of the bush 26 of FIG. 1, the attachment to the flange being effected by means of screws passing through the holes 70. The aperture 68 serves both for the centering of the bush 26 and, obviously, for the passage of the shaft 28 of the wheel. The holes 70 also serve for fixing the caliper-holder or the shoe-holder plate of a disc brake or drum brake respectively.

Preferably, the lateral wall or flange 46, with the central aperture 68 and holes 70, is formed, after the drawing of the housing 24, either by a single pressing operation, or at least by individual pressing of the bearing areas of the attachment members of the flange itself, in such a way that the latter has accurately planar external and/or internal surfaces, and that the central aperture and the holes are accurate both in their dimensions and positions, so that they require no further machining operations.

Finally, a flanged circular hole 72 is made in the lower wall 44, which receives, for attachment, the ball-and-socket joint 32 of FIG. 1. Alternatively, the hole 72 could receive, not the ball-and-socket joint 72, but a member having a spherical seating for housing the joint, or a conical or cylindrical seating for keying the shank of the ball-and-socket joint.

Referring now to FIGS. 5, 6 and 7 a second embodiment of the invention will be described. The strut of FIGS. 5, 6 and 7 is intended for a suspension without a steering lever, and does not have, therefore, the lever or arm 36 of the previous embodiments. In FIGS. 5, 6 and 7 the parts similar to those in FIGS. 1 to 3 are indicated by the same reference numerals increased by 100, and will not therefore be described in detail, except to point out any differences from the embodiment shown in FIGS. 1 to 4.

In the embodiment of FIGS. 5 to 7 the fixing flange 166 comprises, essentially, the entire lateral end wall of the housing 124.

Onto the upper wall 142 of the housing 124 there is fixed an additional reinforcing member formed by a sleeve 174 of strong, drawn sheet metal having a substantially frusto-conical shape. The larger base of the sleeve 174 has a peripheral flange 176 which is welded to the upper wall 142 around the flanged aperture 158 of the latter. The smaller base of the sleeve 174 is defined by a cylindrical bush portion 178 which defines a circular aperture aligned with the aperture 158 and spaced upwardly from the latter.

The lower portion 160 of the tubular member 114, which also has, in this case, a slightly smaller diameter than the rest of the member, extends with a force-fit through the bush portion 178. Its lower end is engaged in the flanged circular aperture 158, and is fixed to the flange or edge of the aperture 158 by means of a continuous head-weld 161. In this embodiment also, the tubular member 114 is firmly held in the housing 124 and, due to the abutment of the annular shoulders 164 against the upper edge of the bush portion 178, the tubular member 114 cannot "sink" into the interior of the housing 124, while the welding of its lower end to the edge of the aperture 158 prevents the tubular member 114 from slipping out of the housing 124.

The strut shown in FIGS. 8 to 11 is similar to that shown in FIGS. 5 to 7. The parts similar to those of FIGS. 5 to 7 are indicated by the same reference numerals increased by a further 100, and will not therefore be described in detail, except to point out any differences from the embodiment of FIGS. 5 to 7.

Referring now to FIGS. 8 to 11, the strut comprises an upper tubular member of sheet metal 214 to which is welded a small sheet metal washer 222 adapted to act as a shoulder or abutment member for the lower end of the helical coil spring (not shown) of the suspension. In the case of suspensions of a different type, for example, with torsion bars, leafsprings and the like, the washer 222 is absent.

The connecting member 224 again comprises a housing formed by a single piece of strong, drawn sheet metal, for example, sheet steel of a suitable thickness, which may be of the order of 3 to 4 millimeters.

The housing 224 comprises, in this case also, an upper wall 242, a lower wall 244, a lateral end wall 266 or fixing flange and pair of opposing, shaped faces 248,250.

The lateral back wall 266 has a large circular aperture 268 surrounded by a ring of holes 270 (four in this example). The aperture 268 is adapted to receive, with a close-fit, a corresponding part of a bearing bush of the vehicle wheel, while the holes 270 serve to fix the bush by means of bolts. In the case of a non-driven steering wheel, the circular aperture 268 may receive, with a close-fit, a corresponding part of a bearing spindle. The wall or flange 266 has, at its four "corners", respective lugs 269, 269a. The lugs 269 are pierced by holes 271 which, in this example, are intended for the attachment, by bolts, of a caliper holder of a disc brake.

In FIGS. 8 to 11 there is shown a suspension strut for a left-hand steering wheel. In the case of a right-hand steering wheel there are holes 271 in the lugs 269, while the other two lugs 269a have holes 271a, shown in broken lines.

In the case of a shoe-brake, all four lugs 269, 269a may have holes 271, 271a for the attachment of the shoe-holder plate of the brake.

Preferably, in this embodiment also, the lateral wall or flange 266 with its central aperture 268 and holes 270, 271 and/or 271a is formed, after the drawing of the housing 224, either wholly by means of a pressing operation or at least by pressing in the bearing areas of the attachment members of the flange itself. A flanged circular hole 272 is provided in the lower wall 244 of the housing 224.

An additional reinforcing member, or upper sleeve 274, of the housing 224 is analogous to the sleeve 174 of FIGS. 5 to 7. Its various parts are indicated by the same reference numbers further increase by 100 and will not be described in detail.

The lower portion 260 of the tubular member 214 has a slightly smaller diameter than that of the rest of the member and extends with a force-fit through the bush portion 278. In the case too, the difference in diameter between the lower portion 260 and the upper portion of the tubular member 214 defines an annular shoulder 264 which abuts against the upper edge of the bush portion 278.

The lower end 260a of the tubular member 214 has a diameter which is further reduced with respect to the portion 260 and is engaged in the flanged circular aperture 258, being fixed to the flange or edge of the aperture by means of a continuous bead-weld 261. In this way, as in the embodiment shown in FIGS. 5 to 7, the tubular member 214 is firmly engaged in the housing 224 and the double engagement gives it a high resistance to bending. Furthermore, because of the abutment of the annular shoulder 264 against the upper edge of the bush portion 278, the tubular member 214 cannot "sink" into the interior of the housing 224, while the welding 261 of its lower end to the edge of the aperture 258 prevents the tubular member 214 from slipping out of the housing 224.

Figure 12:
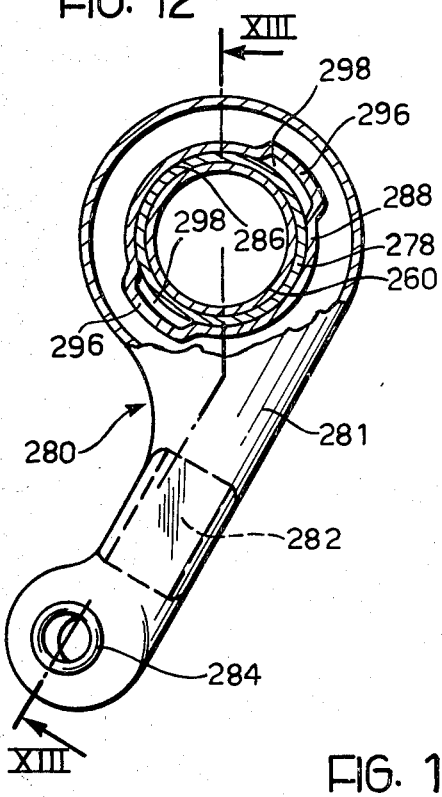
FIG. 12 is a cross section, on an enlarged scale, taken along the broken line XII—XII of FIG. 8.

As shown in FIGS. 8 to 11, a steering lever or anchorage lever comprising a member 280 of strong drawn sheet metal, is connected to the strut and may be seen better in FIGS. 12 and 13.

The lever 280, shown by way of example, comprises an arm 281 having, so to speak, an "offset" configuration with an inverted U-shaped profile. Within the part with the inverted U-shaped profile a reinforcement bracket 282, also having a U profile, is welded. The lever 280 may also have stiffening ribs (not shown), in addition to, or instead of, the bracket 282, and the latter may have a different shape from that shown.

A free end of the lever 280 is provided with an articulation bush 284 which is adapted to receive one of the elements of a knuckle joint for connection to a steering link rod or an anchoring bar.

Figure 14:
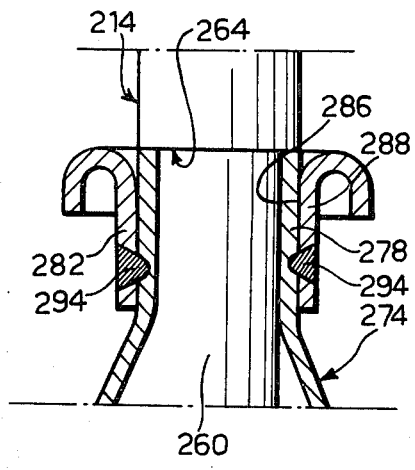
FIG. 14 is a fragmented sectional view, on an enlarged scale, of a part of FIG. 11, showing a variant of the connection between a steering lever and a tubular member of the strut of FIGS. 8 to 13.

The other end of the lever 280 has a connecting eye 286, the periphery of which is defined by a cylindrical flange 288 with an internal diameter corresponding to the external diameter of the bush portion 278 of the sleeve 242. The flange 288 is closely fitted onto the bush portion 278 and fixed thereto by means of one or two bead welds (290,292 in FIG. 11). Alternatively, the flange 288 may be fixed to the bush portion 278 by means of so-called "electrical rivetting", that is, by welding the flange 288 and the wall of the bush portion 278 together at discrete points. Two of these electrical rivets 294 are shown in FIG. 14.

As will be understood, the lever 280 lends itself to a simple connection to a steering link rod in the case of a steering box situated in a high position, that is, in a position higher than the housing 224. However, the use of a lever similar to that shown, but offset downwards for connection to a rod situated at the level of the housing 224, or at a lower level, is not excluded. The lever 280 can serve as an anchorage for the strut in the case of a non-steering wheel.

The torsional stresses of the steering are transmitted by the lever 280 to the housing 224 through the reinforcement sleeve 274, which may be proportioned such that it has the desired strength. These stresses have no effect on the lower portion 260 of the tubular member 214.

When high torsional stresses are expected it is appropriate, for safety reasons, to key the flange 288 of the lever 280 to the bush portion 278 of the sleeve 242. The "electrical rivets" 294 (FIG. 14) may be sufficient for this but, preferably, as shown in FIG. 12, the flange 288 and the bush portion 278 are made, by means of a drawing operation, with respective lateral projections or locating parts 296 and 298 which are radially outwardly deformed with respect to the circular shape of the respective sheet metal parts. The deformed parts 298 of the bush portion 278 form keys while the deformed parts 296 of the flange 288 form seatings for receiving the keys.

Figure 15:
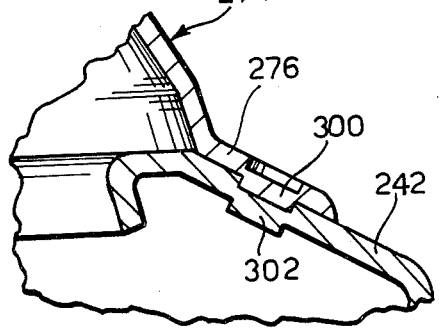
FIG. 15 is a fragmented section view, on an enlarged scale, one form of keying between the reinforcement sleeve and the housing of the connecting member of FIGS. 8 to 13.
Figure 16:
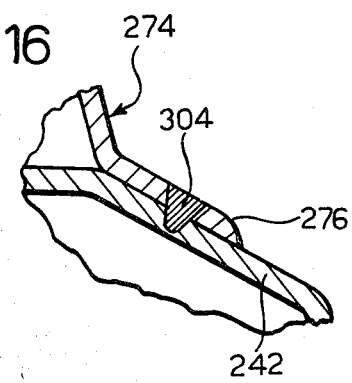
FIG. 16 and 17 are sections similar to FIG. 14, showing respective variants of the keying.
Figure 17:
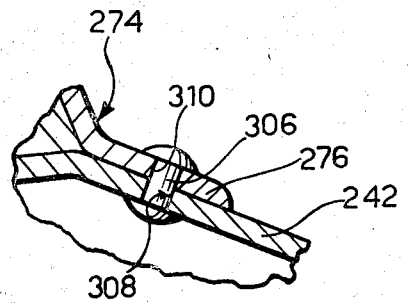

Again, in the case of high torsional stresses, it is appropriate also, for safety reasons, to key the flange 276 of the sleeve 274 and the upper wall 242 of the housing 224. An appropriate form of keying is shown in FIGS. 8 to 11 and on an enlarged scale in FIG. 15. As can be seen, the flange 276 and the wall 242 are made, by means of a discontinuous cutting operation, with respective locating parts 300 and 302 which are deformed out of the plane of the respective sheet metal parts. The deformed part 300 of the flange 276 forms a key while the deformed part 302 of the upper wall 242 forms a seating for receiving the key. Naturally, the keying parts could be deformed in the opposite direction, that is, the wall 242 could have the key and the flange 276 could have the corresponding seating. Alternatively, as shown in FIG. 16, the keying may comprise at least one point 304 of "electrical rivetting" of the type defined above, interconnecting the flange 276 and the upper wall 242. According to another variant (shown in FIG. 17), the keying may comprise a pin or rivet 306 inserted in corresponding holes 308, 310 in the upper wall 242 and the flange 276.

The strut shown in FIGS. 18 to 20 is in parts similar to that shown in FIGS. 1 to 3 and FIGS. 8 to 11. The parts similar to those of FIGS. 1 to 3 are indicated by the same reference numerals increased by 300 and the parts similar to those of FIGS. 8 to 11 are indicated by the same reference numerals increased by a further 100. None of these similar parts will be described in detail except to point out any differences from the corresponding parts of the other embodiments.

Thus, the strut of FIGS. 18 to 20 comprises an upper tubular member of sheet metal 314 and a connecting member 324. The connecting member 324 again comprises a single piece of strong, drawn sheet metal in the form of a housing, for example, sheet steel of a suitable thickness, which may be of the order of 3 to 4 millimeters.

The housing 324 comprises, in this case also, an upper wall 342, a lower wall 344, a lateral end wall 366 or fixing flange and a pair of opposing, shaped faces 348 and 350.

The lateral end wall 366 is similar to the corresponding walls 66, 166 or 266 of the preceding embodiments and it also has a large circular aperture 368 which is adapted to receive with a close fit a corresponding part of a bush or bearing spindle of the vehicle wheel.

An additional reinforcing member or intermediate wall 352, similar to the member 52 of the first embodiment shown in FIGS. 1 to 4, is located in the upper part of the housing 324 but without any lower arm.

The reinforcing member 352, which is of strong, drawn sheet metal, is in the form of a bush, in plan, and has an annular radial wall 353. The periphery of the annular wall 353, on the part facing the lateral end wall 366, has an upwardly projecting, partially cylindrical flange 354. The housing 324 has a pair of wall-portions 355, corresponding to the flange 354, to which the flange 354 is welded by means of bead-welds 356.

The reinforcing member 352 also has a flanged circular aperture 362.

A steering lever of anchorage lever comprising a member of strong, drawn sheet metal, generally indicated 380 and easily seen in FIG. 19, is connected to the strut.

The lever 380, shown by way of example, comprises an arm 381 having so to speak, an "offset" configuration and a structure of which may be similar to that of the lever 280 of the preceding embodiment.

A free end of the lever 380 is fitted with an articulation bush 384 which is adapted to receive one of the elements of a knuckle joint for connection to a steering link rod or an anchoring bar.

The other end of the lever 380 has a circular aperture 386 the periphery of which is defined by a substantially cylindrical flange 388 projecting towards the interior of the housing 324. The flange 388, is formed by cutting and stamping of a part of the wall 399 of the lever 380. The part of the wall 399 forms a supplementary will located above the upper wall 342 of the housing 324, these two walls 342, 399 comprising a double upper wall, so to speak, of the housing.

The wall 342 has a circular aperture 358 defined by a substantially cylindrical flange 349 projecting towards the interior of the housing 324 and corresponding to the aperture 386. The two apertures 358 and 386 are aligned precisely with the aperture 362 of the reinforcing member 352. The flange 388 is closely fitted within the flange 359 and has, preferably, a slightly greater axial length than the flange 359. The two flanges 359 and 388 are welded together along the free edge of the flange 359 by means of a continuous bead-weld 392.

A lower portion 360 of the tubular member 314 is force-fitted into the flanged aperture 386. The lower end of the portion 360 is engaged in the lower aperture 362 and welded to the flange or an edge of the latter by means of a continuous bead-weld 361.

The lower portion 360 of the tubular member 314 has a slightly smaller diameter than the rest of the member so as to define an annular bearing shoulder 364 on the edge of the aperture 386.

The supplementary wall 399 is folded over to form a downwardly extending peripheral skirt 400 which is partially cylindrical and which surrounds a corresponding, partially cylindrical, upper portion of a wall 402 forming an upper extension of the lateral end wall 366 of the housing 324. The skirt 400 and the wall portion 402 are substantially coaxial with the circular apertures 358 and 386.

In the variant shown in FIGS. 18 to 20, the torsional stresses are transmitted, as in the variant of FIGS. 8 to 11, by the lever 380 to the housing 324 without passing through the lower portion 360 of the tubular member 314.

When high torsional stresses are expected, it is appropriate, for safety reasons, to key the skirt 400 to the wall portion 402 of the housing. This keying preferably comprises at least one "electrical rivet" 394 (FIGS. 18 and 19), which is similar to the "rivets" 294 shown in FIG. 14.

The connection between the strut and the housing 324 has advantages similar to those described in relation to the first embodiment, shown in FIGS. 1 to 4. It should be noted, however, that the flange 358 may be made with a relatively large axial length. In fact, from the substantially flat wall 399 of the lever member 380 it is easy to stamp a great quantity of material to form the flange 358. The form of the housing 24 of FIGS. 1 to 4 and 324 of FIGS. 18 to 20 is already complex in itself and the production of a flanged aperture, such as the aperture 58, having a flange of great axial length, would constitute a further complication in the process of stamping the housing.

As will be understood, the engagement of the lower portion 360 of the tubular member 314 with the flange 358, which forms a relatively long bush, is better than that which would be obtained if the lower portion 360 were fixed directly to the relatively short flange 359.

What is claimed is:

1. In a strut for MacPherson-type suspensions for motor vehicles, of the type comprising an upper tubular member of sheet metal which forms the cylinder of a telescopic shock absorber, and a sheet metal housing having upper wall with a circular aperture, a lower wall with a hole for the attachment of one of the parts of a ball-and-socket joint of a suspension wishbone, a lateral end wall defining a flange for the attachment of a bearing bush or bearing spindle and a static part of a wheel brake, and a pair of opposing faces, a lower portion of the tubular member being engaged in the circular aperture of the upper wall of the housing and fixed to the housing by welding; the improvement therewith: wherein an additional reinforcing member of sheet metal is welded to the housing to define a supplementary wall adjacent to the upper wall of the housing, the supplementary wall having a circular aperture aligned with and spaced from the circular aperture of the upper wall, and wherein the lower portion of the tubular member is engaged with a close fit into said two aligned apertures and is fixed by welding to an edge of at least one of the apertures.

2. The strut according to claim 1, wherein the tubular member has a shoulder which abuts externally against an edge of the outer circular aperture with respect to the housing, and in that the tubular member is welded at its lower end to an edge of the inner circular aperture with respect to the housing.

3. The strut according to claim 2, wherein the additional reinforcing member comprises an intermediate wall of drawn sheet metal which is disposed within the housing, substantially parallel to the upper wall and including said inner circular aperture, the additional member being fixed by welding to the interior of the housing.

4. The strut according to claim 3, wherein the intermediate wall has, substantially in its plane, a shaped arm which projects from the open face of the housing and is curved or bent such that it has a free end lateral with respect to the housing, this arm forming a steering lever or an anchoring arm.

5. The strut according to claim 1, wherein the additional reinforcing member comprises a substantially frusto-conical sleeve of drawn sheet metal which is attached to the upper wall of the housing, the larger base of the sleeve having a peripheral flange welded to the upper wall around the circular aperture in the latter, and the smaller base being delimited by a cylindrical bush portion which defines the other circular aperture aligned with the circular aperture of the upper wall.

6. The strut according to claim 5, said strut further comprises a steering lever formed by a member of strong drawn sheet metal having a connecting eye, the periphery of which is defined by a cylindrical flange which fits closely onto the bush portion of the reinforcing sleeve and which is welded to the bush portion.

7. The strut according to claim 5, wherein the peripheral flange of the reinforcing sleeve and the upper wall of the housing are interconnected by keying means.

8. The strut according to claim 7, wherein the keying means between the peripheral flange and the upper wall comprise at least one seating formed in the sheet metal of one of the cooperating parts constituting the upper wall and the peripheral flange, and at least one projection, of complementary shape, formed in the other of the said parts, and engaged with precision in said seating.

9. The strut according to claim 8, wherein the respective seatings and projections comprise portions of the respective sheet metal parts deformed out of their planes.

10. The strut according to claim 7, wherein the keying means between the peripheral flange and the upper wall comprise at least one point of electrical rivetting interconnecting the peripheral flange of the sleeve and the upper wall.

11. The strut according to claim 7, wherein the keying means between the peripheral flange and the upper wall comprise at least one rivet engaged in respective, cooperating holes in the upper wall and the peripheral flange.

12. The strut according to claim 6, wherein the flange of the connecting eye and the bush portion of the reinforcing sleeve are interconnected by keying means.

13. The strut according to claim 12, wherein the keying means between the flange and the bush portion comprise at least one internal lateral seating formed in the flange and of at least one corresponding external lateral projection formed in the bush portion.

14. The strut according to claim 13, wherein the lateral seating and the lateral projection are formed by radially outwardly deformed portions.

15. The strut according to claim 12, characterized in that the keying means between the flange and the bush portion comprise at least one point of electrical rivetting which interconnects the flange and the bush portion.

16. The strut according to claim 15, wherein it includes a plurality of points of electrical rivetting which comprise the attachment welding between the bush portion and the flange.

17. The strut according to claim 3, wherein the upper wall of the housing is a double wall comprising the upper wall, and a supplementary wall located above the latter, the walls having respective aligned circular apertures within which is engaged the tubular member, the shoulder of the tubular member abuts against the edge of the supplementary aperture, and in that the supplementary wall forms a part of a steering lever or anchoring lever including a member of strong drawn sheet metal, the lever being fixed by welding to the housing.

18. The strut according to claim 17, wherein the upper wall of the housing and the supplementary wall have respective, substantially cylindrical flanges projecting towards the interior of the housing, the flange of the supplementary wall being closely fitted within the flange of the upper wall, the tubular member being closely fitted within the flange of the supplementary wall.

19. The strut according to claim 18, characterized in that the flange of the supplementary wall has an axial length greater than the flange of the upper wall.

20. The strut according to claim 19, wherein the free edge of the flange of the upper wall is welded to the flange of the supplementary wall by means of a bead-weld.

21. The strut according to claim 20, wherein the supplementary wall has a peripheral skirt which encloses an upper wall portion of the housing and is connected to the wall portion by keying means.

22. The strut according to claim 21, wherein the keying means comprise at least one point of electrical rivetting.

23. The strut according to claim 22, wherein the skirt and the upper wall portion are partially cylindrical and are substantially coaxial with the said circular apertures.

* * * * *